Jan. 8, 1924.

F. L. MORSE 1,480,528

DRIVE CHAIN

Filed Sept. 16, 1922     2 Sheets-Sheet 1

INVENTOR
Frank L. Morse
BY Edward A. Wright, ATTORNEY

Jan. 8, 1924.
F. L. MORSE
1,480,528
DRIVE CHAIN
Filed Sept. 16, 1922
2 Sheets-Sheet 2
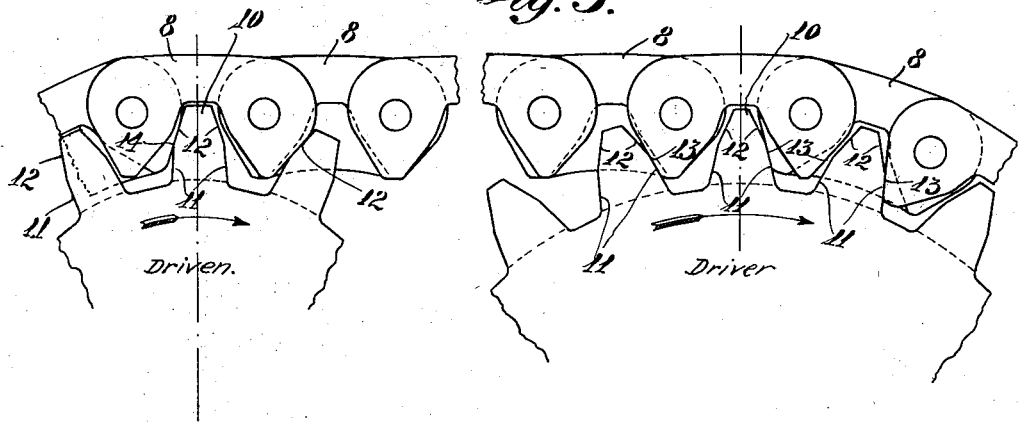
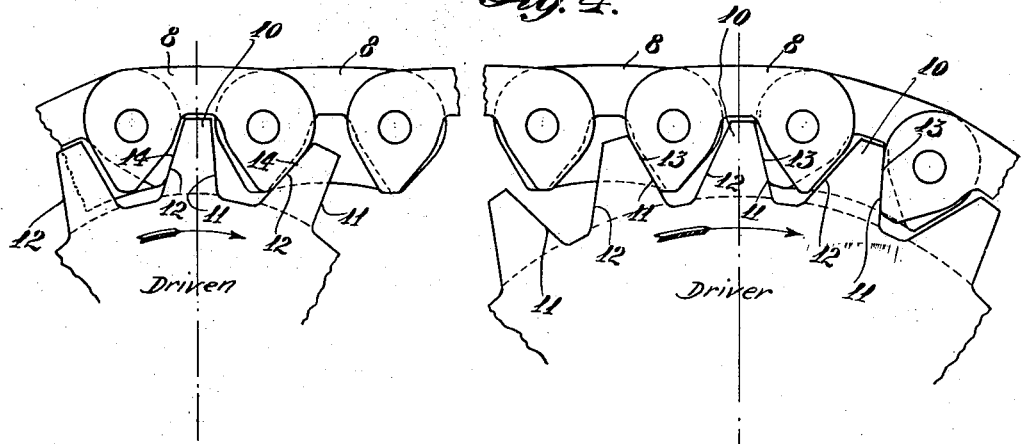
INVENTOR
Frank L. Morse
BY
Edward Wright
ATTORNEY Patented Jan. 8, 1924.

1,480,528

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

DRIVE CHAIN.

Application filed September 16, 1922. Serial No. 588,574.

*To all whom it may concern:*

Be it known that I, FRANK L. MORSE, a citizen of the United States, residing at Ithaca, in the county of Tompkins and State of New York, have invented a certain new and useful Improvement in Drive Chains, of which improvement the following is a specification.

This invention relates to drive chains for power transmission, and more particularly to the multi-plate type of chain in which the links are composed of a plurality of arch-shaped plates and joined together by either single or multi-part pintles.

Heretofore with the particlar form of chain of this type in which the links bear against the sprockets at their outside ends only, it has been the practice to make the links symmetrical, with the angles of the bearing surfaces at both ends the same, and then to cut the teeth upon the sprocket wheels with the same angle to the tooth surface upon opposite sides, this angle varying according to the size of the wheels and number of teeth.

It has been found, however, that in chain drives having small sprockets, such for instance, as in automobile construction where the crank shaft sprocket is formed with eighteen to twenty-four teeth, and the accessory shaft sprocket is formed with a smaller number, such as fourteen or sixteen teeth, when the proper pressure angle is obtained for the crank shaft sprocket, this pressure angle is too small for the teeth of the accessory shaft sprocket to produce a quiet operation. The object of my invention is, therefore, to eliminate or reduce the noise of operation of a chain of this type upon small sprockets, and to produce a quiet running drive.

With this object in view, my invention comprises a drive chain composed of non-symmetrical links having different pressure angles for the outside engaging surfaces at opposite ends, and adapted to co-operate with sprockets having faces at different angles upon opposite sides of the teeth, the engaging surface upon the smaller or driven sprocket being more slanting and making a greater angle with the line of pull than that of the surface at the opposite end of the link which is at a sharper or steeper angle and adapted to engage the driving sprocket.

Figure 1:
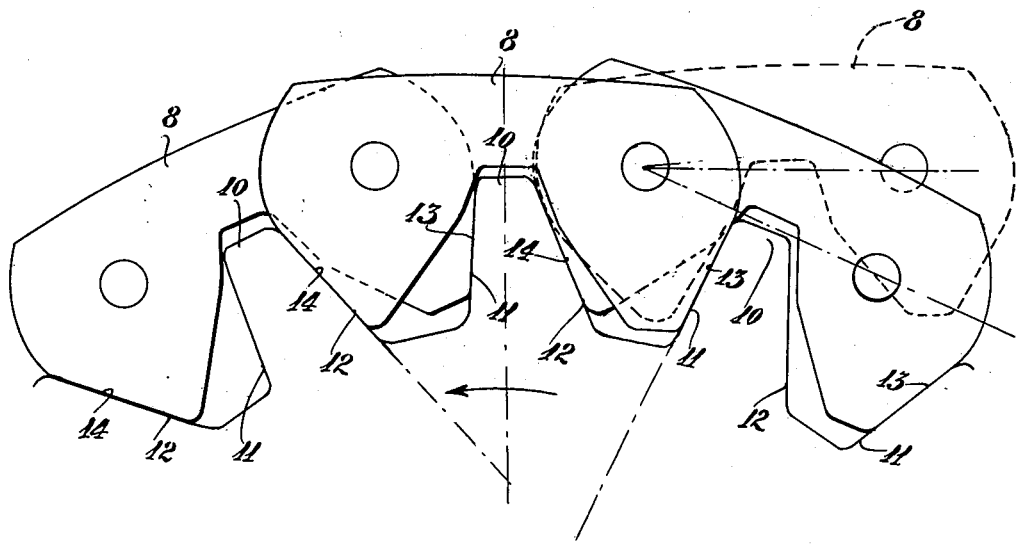
Figure 2:
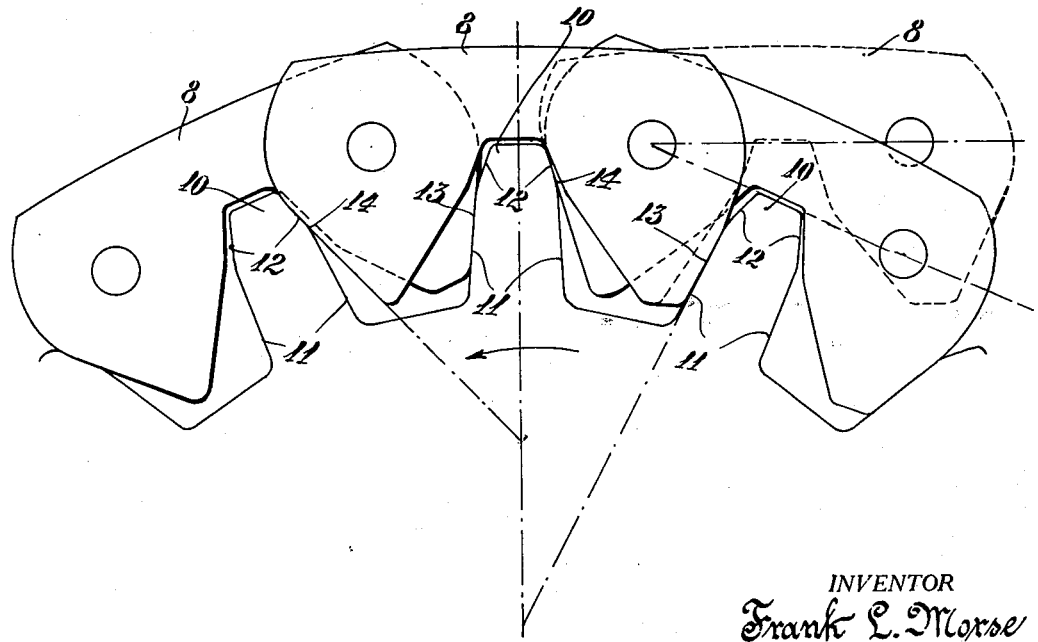

In the accompanying drawings: Figure 1 is a side elevation of three links of a chain embodying my improvement, and applied to a non-symmetrical sprocket; Fig. 2, a similar view showing the chain applied to a symmetrical sprocket having double angle faced teeth; Fig. 3, a side elevation showing the chain applied to a pair of sprockets of the same type shown in Fig. 2; and, Fig. 4, a view similar to Fig. 3, but showing a pair of sprockets having non-symmetrical teeth.

The links of a multi-plate chain of this type are composed of arch-shaped plates, 8, fitting over the teeth, 10, of the sprocket wheels, the plates of each link being formed with external engaging surfaces, 13, and 14, respectively, upon their opposite outside ends for engagement with corresponding bearing faces, 11 and 12, respectively, upon opposite sides of the sprocket teeth.

According to my present invention, the angle of inclination of the engaging surface at one end of the link, such as the surface, 14, is somewhat greater than the angle of inclination of the engaging surface, 13, at the other end of the link, and the bearing faces upon the opposite sides of the sprocket teeth are formed at corresponding angles to cooperate with these engaging surfaces at the ends of the links; that is to say, the bearing face, 12, at the side of the tooth which engages the end surface, 14, of the link, is formed at a greater angle to the line of pull than the bearing face, 11, on the opposite side of the tooth, which corresponds with the angle of the surface, 13. The angle of inclination of the bearing face, 11, on the tooth relative to a radial line may be varied on different wheels according to their size and number of teeth in order to fit the inclination of the external end engaging surface, 13, of the links, while the angle of the bearing face, 12, may be substantially constant for different sized wheels, and corresponds with the greater slant or angle of the other outside engaging surface, 14, relative to the line of pull of the chain.

My improvement may be used with sprocket teeth having only one bearing face, 11, upon one side, and only one bearing face, 12, on the opposite side, in which case the tooth is non-symmetrical, as shown in Figs. 1 and 4, or it may be employed with double faced teeth having one inner bearing face, 11, and one outer bearing face, 12, upon each side of each tooth, thereby making the teeth symmetrical, as indicated in Figs. 2 and 3, and adapted to run in either direction.

As indicated in Figs. 3 and 4, the sprocket bearing face, 11, of the teeth of the larger or driving sprocket engage the end surface, 13, of the links at the steeper or more acute angle, while the bearing face, 12, of the teeth of the smaller or driven sprocket are engaged by the more slanting end surface, 14, of the links, thus making a greater angle to the line of pull which allows for an easy sliding or compensating movement of the chain upon the wheel, which eliminates noise and produces a quiet and efficient drive.

As an example, I have shown, in Figs. 1 and 2, a chain applied to a fifteen toothed sprocket in which the angular movement of the link is twenty four degrees, as indicated by the different positions of the link at the right hand. With a standard form of link having an angle of 60 degrees between the two ends, or 30 degrees for each end, and an angular link movement of 24 degrees, the angle to the line of pull would be only 6 degrees, which is too steep to allow for the desired cushioning effect produced by the link sliding slightly upon the tooth. According to my improvement, the angle of the end engaging surface, 12, for the driven wheel is increased, say to 41 degrees, which, with an angular link movement of 24 degrees, will make an angle to the line of pull of about 17 degrees, and allow for sufficient compensation.

Various other forms of links having different angles of bearing faces and end engaging surfaces may be employed within the scope of my invention.

Having now described my invention, what I claim as new and desire to secure by Letters Patent is:

1. The combination, with sprocket wheels having teeth, each provided with a comparatively steep bearing face upon one side and a less steep bearing face upon the opposite side, of a drive chain formed of non-symmetrical links, each having an outside end engaging surface for said steep bearing face on one sprocket, and a more slanting outside engaging surface at the other end of the link for the less steep bearing face on another sprocket.

2. The combination of a drive chain composed of non-symmetrical links having double outside end engaging surfaces inclined at different angles, and a sprocket wheel having teeth provided with bearing faces inclined at different angles upon opposite sides.

3. The combination of a drive chain composed of non-symmetrical links having double outside end engaging surfaces inclined at different angles, and a sprocket wheel having symmetrical teeth provided with radially inner and outer bearing faces upon both sides, said outer faces being inclined at a greater angle than the inner faces.

4. The combination of a drive chain composed of non-symmetrical links having double outside end engaging surfaces inclined at different angles, and a sprocket wheel having double faced teeth, the outer bearing faces being inclined at a greater angle than the inner bearing faces and cooperating with the end engaging surface having the greater angle of inclination.

5. The combination of a drive chain composed of non-symmetrical links having double outside end engaging surfaces inclined at different angles, and a sprocket wheel having teeth provided with bearing faces inclined at corresponding angles upon opposite sides, the greater angle being constant for different sized wheels.

In testimony whereof I have hereunto set my hand.

FRANK L. MORSE.